United States Patent [19]

Johnson

[11] Patent Number: 5,160,842
[45] Date of Patent: Nov. 3, 1992

[54] INFRARED FIRE-PERIMETER MAPPING

[75] Inventor: David A. Johnson, Jefferson, Oreg.

[73] Assignee: Mid-Valley Helicopters, Inc., Jefferson, Oreg.

[21] Appl. No.: 719,843

[22] Filed: Jun. 24, 1991

[51] Int. Cl.⁵ .................... G01J 1/00; G08B 17/12
[52] U.S. Cl. .................. 250/338.1; 250/342; 250/554; 250/330; 250/340; 340/578
[58] Field of Search ............... 250/340, 342, 338.1, 250/554, 330; 340/578, 600

[56] References Cited

U.S. PATENT DOCUMENTS

| | | | |
|---|---|---|---|
| 1,959,702 | 5/1934 | Barker | 340/578 |
| 4,567,367 | 1/1986 | Brown de Colstoun et al. | 250/340 |
| 4,893,026 | 1/1990 | Brown de Colstoun et al. | 250/574 |
| 5,049,756 | 9/1991 | Brown de Colstoun et al. | 250/342 |

Primary Examiner—Carolyn E. Fields
Assistant Examiner—Drew A. Dunn
Attorney, Agent, or Firm—Kolisch, Hartwell, Dickinson, McCormack & Heuser

[57] ABSTRACT

A fire-perimeter, temperature-differentiating mapping system for creating a temperature-level-differentiated, visually readable outline of a ground fire, which outline is suitable for in-scale registered overlay of a related topographic map for the purpose of aiding firefighters in determining where best to allocate fire-fighting resources.

8 Claims, 2 Drawing Sheets

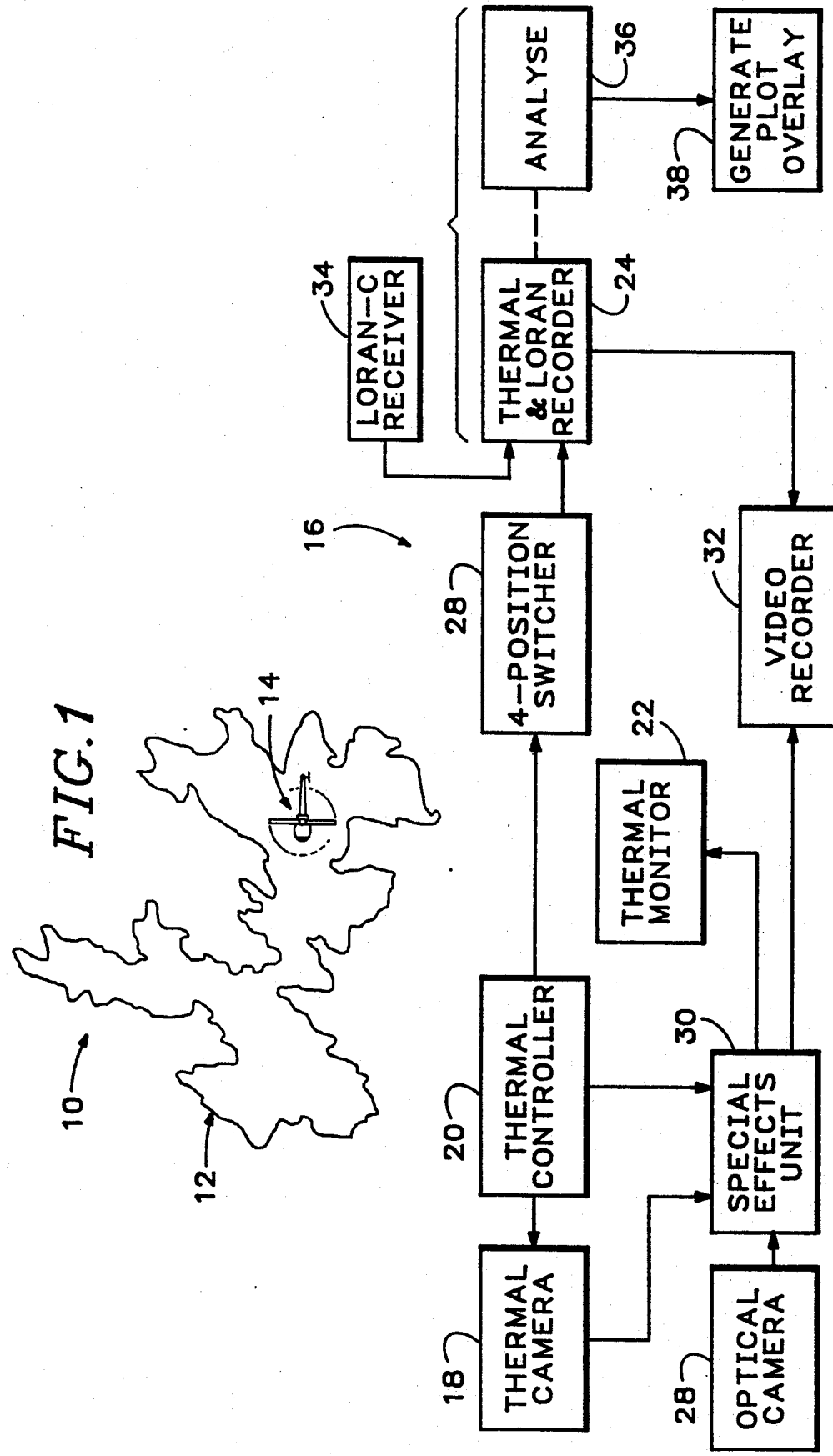

INFRARED FIRE-PERIMETER MAPPING

BACKGROUND AND SUMMARY OF THE INVENTION

This invention pertains to ground fire mapping, and in particular, to a system and method for creating a selected, isothermal, perimetral outline for a fire which outline can be plotted on a transparency sheet suitable for registered overlay of a related topographic map.

The novel features of the invention take advantage of the capability of a thermal imaging camera and related control equipment to produce a data stream which is selectively linked to a chosen isothermal temperature or range of temperatures. By identifying certain temperatures that indicate important fire activity at the boundary of a fire, and by acquiring, for example by flying over a fire, several such data streams relating to different important temperatures, it is possible according to the invention to create a perimetral outline of current fire activity with thermal information which is most useful to the team fighting the fire. For example, there may be certain perimeter areas where a fire is actually creeping under ground but not visible to the eye—creating a condition which firefighters must know about if they are to apply their resources in the most judicious and effective way. Conversely, there may be other areas on the perimeter of the fire where, despite visual information, in truth, significant fire activity has subsided, and people and equipment can accordingly be diverted from such an area for use where more help is needed. Other perimeter conditions may also be useful to note specifically.

By the use of the present invention, a fire-fighting team can be given extremely current and accurate information about the character of a fire's perimeter, in a fashion suitable for overlaying, in proper scale, and with proper registry, on a topographic map of the fire area. Loran (latitude/longitude) information, also acquired with thermal information by the system and method of the present invention, enables such overlaying capability.

These and other objects and advantages which are achieved and offered by the present invention will become more fully apparent as the description which now follows is read in conjunction with the accompanying drawings.

DESCRIPTION OF THE DRAWINGS

FIG. 2 is a simplified block diagram illustrating the organization of a preferred embodiment of the system of the invention.

DETAILED DESCRIPTION OF AND BEST MODE FOR CARRYING OUT, THE INVENTION

Figure 1:
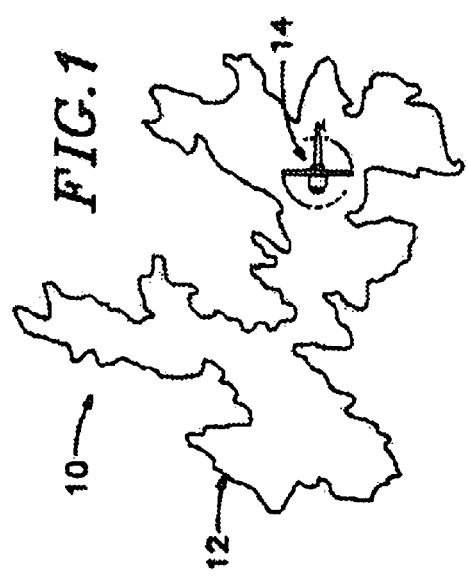
FIG. 1 is an aerial view illustrating the perimeter outline of a ground fire, and showing, not to scale, and not in a precisely located position, a rotary-winged aircraft which acts as a "platform" for carrying the equipment used according to the invention for capturing related thermal, visual and positional data.

Turning attention now to the drawings, and referring first of all to FIG. 1, indicated generally at 10 is an aerial view of a ground fire with the current active perimeter of the fire shown generally by a single, unbroken line at 12. Overflying this fire in appropriate multiple passes to acquire data, in accordance with the method and system of the present invention, is a rotary-winged aircraft 14 which is not shown in scale relative to the area embraced by perimeter 12. Aircraft 14 typically flies at an altitude of about 50- to about 150-feet above the ground surface. It is on board this aircraft, which acts as a moving support platform, that the data-acquiring components of the system of the present invention are carried for the purpose of building a suitable cache of recorded data which can be employed to generate a useful fire-perimeter outline indicating selected isothermal characteristics.

As was suggested earlier, there are several categories of perimeter fire conditions which indicate quite useful information to firefighters. For example, an isothermal temperature of around 25° C. indicates what might be thought of as a fire-containment condition, namely, one which does not require people and equipment to attend. An isothermal temperature of around 50° C. is usually an important indicator of buried heat—a condition with the fire probably advancing nonvisibly under the ground surface cover. An isothermal temperature of around 100° C. indicates a kindlingpoint condition where fire either has just started or is just probably about to start. An isothermal condition at a temperature of around 150° C. normally illustrates an open-flame condition. Naturally, these several isothermal temperatures are just indicative of conditions which fire-fighting personnel might wish to know about. The exact levels of isothermal activity which different observers might wish to use may be different than the above, and the system of the invention permits such selection. In addition, one choosing to look at such isothermal conditions might wish to choose, not just a fire condition exactly existing at a selected isothermal temperature, but rather at a condition which lies within a selected range of temperatures centered around a selected isothermal level. The system and method of the present invention permits this kind of activity also.

As will become apparent in the description which now follows that more fully describes the system and method of the invention, and as was suggested earlier herein, an important final output product is a transparent-overlay perimeter map which shows, by different outlining characteristics, such as by different colors, regions of a fire's perimeter which are characterized by the selected, "key" isothermal conditions that an operator has chosen for noting. This overlay, which the system is capable of producing in proper scale for proper registry with a related topographic map, is used by a fire-fighting commander quickly and accurately to deploy people and equipment at necessary and critical fire points.

Switching attention now to FIG. 2 in the drawings, the overall system of the invention is shown generally at 16. System 16 includes a thermal camera 18, a thermal controller 20, a thermal monitor 22, and a thermal and Loran (Loran-C) recorder 24. Camera 18 and controller 20 are referred to herein collectively as thermal data-acquisition apparatus, and recorder 24 is also called thermal and latitude/longitude data-recording apparatus. These units are commercially available units, and in the system now being described, camera 18, controller 20 and monitor 22 are made by AGEMA Infrared Systems, a Swedish-headquartered company whose U.S. counterpart is located in Secaucus, N.J. Each of these units is sold under the Model No. 870. Recorder 24 is a commercially available unit supplied by Technology Projects, Ltd., Tempe, Ariz., is sold under the trademark PATHLINK, and bears Model No. PR-2000. Recorder 24, as provided, includes four channels for the inputting of thermal data, and according to the system and method of the invention, operatively, connectively interposed recorder 24 and controller 20 is an appropriate four-position switcher, or switching means, which is operable under user control to direct thermal imaging data from the output (output means) of controller 20 in the thermal apparatus selectively toward any one of the four inputs so provided by recorder 24. This switcher is shown at 26 in FIG. 2.

Camera 18 and controller 20 collectively are capable of outputting, from controller 20, and selectively, different thermal-image data streams which are differentiated by specifically different isothermal characteristics. More particularly, an operator can adjust, via conventional control of controller 20, the specific isothermal temperature, or isothermally-centered-temperature range of temperatures, which, at any given point in time, is output by the controller.

Further included in system 16 are an optical (herein a video) camera 28, a special effects unit 30, and a video recorder 32. The optical camera now used by me in system 16 is made by Hitachi Denshi Ltd. of Tokyo, Japan, and bears Model No. KPC 500; the special effects unit 30 is made by Panasonic Industrial Company of Secaucus, N.J., and bears Model No. WJ-4600C; and video recorder 32, which is part of a camcorder unit, is made by Sony Corporation and bears Model No. CCD-5P7. Camera 28 and recorder 32 together are referred to as an optical data-acquisition subsystem.

Special effects unit 30 interconnects cameras 18, 28, controller 20, monitor 22 and recorder 32 in such a fashion that appropriate synchronization exists between information derived by camera 18 and by camera 28 to permit, both, proper common-time-base overlayed viewing (thermal and optical imagery) on monitor 22, and common-time-base overlayed recording on recorder 32.

All of the system components which have so far been mentioned are preferably carried on board a fire-overhead, moving platform, such as aircraft 14, along with yet another unit, shown at 34, which is a conventional LORAN-C receiver, also referred to as latitude/longitude data-acquisition apparatus. Receiver 34 herein is made by the II Morrow Inc. of Salem, Oreg., and bears Model No. 612 BCV. This receiver acquires latitude/longitude positional information from the well-known LORAN-C navigational satellite system, and outputs, via an appropriate output terminal (output means), a data stream providing such information to an input in recorder 24, which information is automatically, via operation of recorder 24, switched internally for simultaneous recording on whichever channel is then being fed thermal information from controller 20 via switcher 26.

Completing a description of system 16, operatively couplable to recorder 24, but preferably stationed at some suitable ground station (other than on board aircraft 14) is a data reader and analyser (reading and analysing means) 36 which herein is a conventional piece of equipment also made available by Technology Projects Ltd., also sold under the trademark PATHLINK, and bearing Model No. PCI-100. The output of this analyser is coupled to the control input of a conventional multi-color, X-Y, graphics plotter, indicated at 38, and in system 16, I have successfully used for such a plotter one made by Ioline Corporation in Kirkland, Wash., sold under the Model No., and trademark, LP 3700.

Explaining how the system of the invention performs, during the flying over of a fire, flight takes place in several passes, typically three or four, generally above what can be observed to be the apparent perimeter of the fire. Both cameras in the system, are activated. The operator of the system, using visual observation and experience, and pre-selection of the several isothermal temperatures, or ranges thereabout, which he or she desires to record as making up the fire's perimeter, periodically throughout the various flight passes adjusts the thermal data-acquisition system, through adjustments made in controller 20, so that this system, at any given point in time, outputs from controller 20 to unit 30 and switcher 28, a thermal-image data stream which is related specifically to the selected isothermal temperature or range. For each such temperature or range, and system 16 as disclosed herein accommodates four, the operator selects the position for switcher 28 which directs the selected thermal-image data into a prechosen related one of the four recording channels provided in recorder 24.

Unit 30 coordinates synchronized presentation of optical and thermal video data to monitor 22 and simultaneously to recorder 32. The system operator can, via monitor 22, see an optical display of the ground passing beneath, and overlayed thereon, an isothermal presentation of the fire character (heat character) of whatever portion of the visible fire line has a fire characteristic fitting within the chosen isothermal parameter(s). Recorder 32 simultaneously records on tape, or on other suitable recording media, similar overlayed imagery.

All of the while that this is occurring, the appropriate selected channel in recorder 34 is recording, on a common-time basis, the selected isothermal information passing through switcher 28, as well as latitude/longitude positional information furnished via receiver 34. From the output mentioned earlier from recorder 24, latitude/longitude positional information is furnished for simultaneous recording, for later viewing review, on the media used by recorder 32.

As flight over the fire perimeter continues, the operator switches selectively, through operation of controller 20, to different ones, and as illustrated herein, all, of the four, possible, chosen isothermal characteristics of the fire line, simultaneously selecting the appropriate position for switcher 28 to direct, for each of the different selected isothermal characteristics, thermal-image data to the appropriate, associated recording channel in recorder 24. When a change is made in the current selection of isothermal information, the operations of recorder 24, recorder 32 and monitor 22 are as described initially hereinabove, vis-a-vis (1) recording thermal-image and latitude/longitude positional information in recorder 24, (2) recording latitude/longitude positional information as well as overlayed thermal and optical information in recorder 32, and (3) presenting overlayed thermal and optical information on monitor 22, with the recorded and presented thermal information at any given time relating directly to the then selected-to-be-viewed isothermal condition of the fire's perimeter.

After all data has been acquired to the satisfaction of the operator, the aircraft returns to the station where analyser 30 and plotter 38 are located, the analyser is suitably coupled to recorder 24, and the analyser then extracts and analyses, from each of the four recording channels in recorder 24, the stored data which it then analyses to create a control signal for plotter 38 which is capable of creating an isothermal plot outline of the viewed fire's perimeter.

Figure 3:
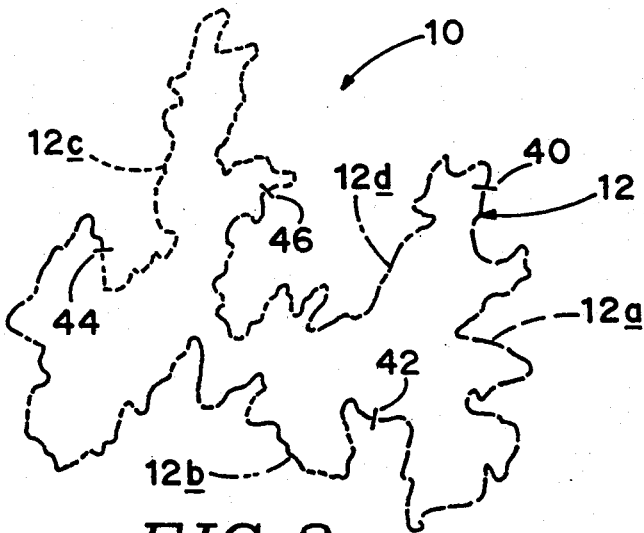
FIG. 3 is an aerial view of the same fire shown in FIG. 1, with stretches of the perimeter illustrated with different line characteristics to illustrate depiction of the fire, as an output of the system, with selected isothermal temperatures highlighted on the perimeter.

For the purpose of illustration herein, a highly idealized situation is illustrated in FIG. 3 to show how such a plot might appear. Here, the fire and its perimeter are shown, as earlier, at 10 and 12, respectively, with these having essentially the same overall shapes illustrated in FIG. 1. In FIG. 3, perimeter 12 is divided into four stretches, 12a, 12b, 12c, 12d, which are represented by different line characteristics to reflect differentiated isothermal fire conditions existing in these stretches. In FIG. 3, stretch 12a, which is illustrated by a large-dash dashed line extends between markers 40, 42, and can be imagined herein as depicting an isothermal temperature condition of around 25° C. Stretch 12b, which is illustrated by a dash-double-dot line extending between markers 42, 44, can be imagined as illustrating an isothermal condition with a temperature of around 50° C. Stretch 12c, which is depicted with a short-dash dashed line extending between markers 44, 46, can be imagined to represent a fire-perimeter isothermal temperature of around 100° C. And, stretch 12d, which is shown with a dash-dot line extending between markers 46, 40, can be imagined to reflect an isothermal perimeter fire condition of around 150° C. These temperatures are, of course, the ones mentioned above, which an operator might choose in using system 16.

Plotter 38 is capable, under control of the signal supplied by analyser 36, to create a plot like that shown in FIG. 3, with the various perimeter stretches mentioned, that are depicted between the bounding markers, printed in different colors which can readily and quickly be interpreted to indicate the specific isothermal conditions being illustrated. One should recognize in reading this description that where the term "isothermal" is used it is intended in the sense that what may be depicted may in fact focus entirely on exactly the chosen isothermal temperature, or, in the alternative, on a range of temperatures (also selected) which substantially, centrally brackets a chosen isothermal condition.

Plotter 38, via its commercially available design, and under the control of analyser 36 is capable of preparing, in a conventional manner, now, on a transparency a plot like that shown in FIG. 3 which will have the appropriate scale, and which will be marked for correct positional registration for interpretive overlay on a related topographic map.

Figure 4:
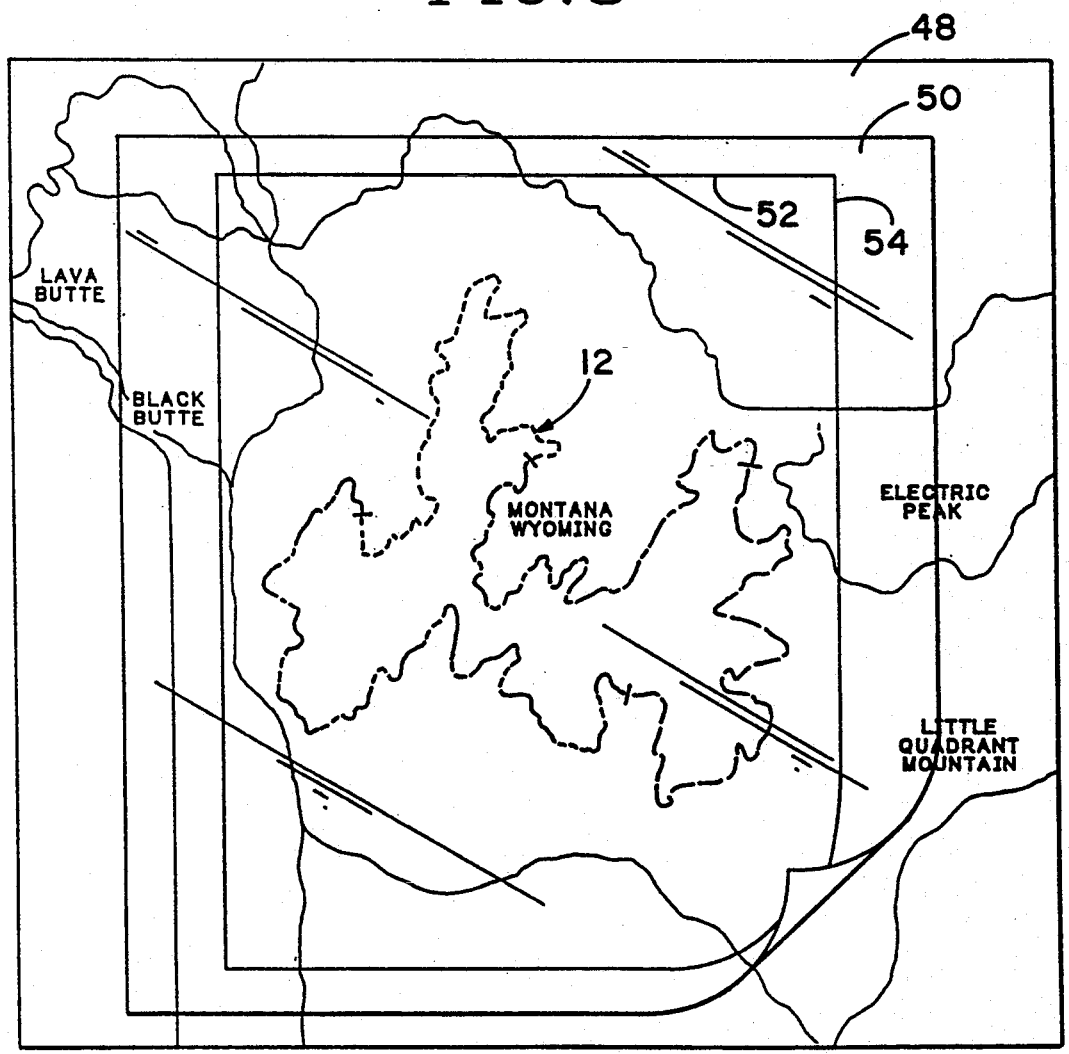
FIG. 4 is a view illustrating a plot of the outline shown in FIG. 3 prepared on a transparency which is overlayed, in proper scale, and with proper registry, onto a topographic map of the area where the fire is occurring.

Turning attention to FIG. 4, such a map is shown at 48, with a transparent overlay prepared by plotter 38 shown at 50 including registration marks, like those shown at 52, 54 provided on the overlay for assisting in proper registered placement of the overlay on the map. Fire perimeter 12, appearing in the transparency with color-differentiated isothermal stretches, illustrates to a fire-fighting command team exactly what is going on, fire-wise, along the fire's perimeter, and exactly where it is occurring relative to the actual ground area as depicted by the underlying topographic map.

From the description and discussion which has been given above, it should be apparent to those skilled in the art that the novel system and method of the present invention offers a unique opportunity for assisting greatly in informing ground firefighters how best to deploy people and equipment to bring a fire into containment. The invention offers a great deal of versatility, in that it allows a system operator to select, freely, various isothermal conditions which may be of interest at different given points of time to aid in firefighting decision-making. The disclosed system and method are, of course, not limited to the selective presentation in a plotted outline of only four different isothermal conditions or ranges. Modifications of the system, and implementation thereof, can involve the selection of more or less isothermal conditions, as desired. The proposed system is convenient and easy to use, is easy to transport in a moving platform over a fire, and is capable of providing extremely current and accurate decision-making information to a fire-fighting team.

Accordingly, while a preferred embodiment of, and method of practicing, the invention have been disclosed herein, with certain modification possibilities mentioned, other variations and modifications are centainly possible, and may be made, without departing from the spirit of the invention.

It is desired to claim and secure by letters patent:

1. A fire-perimeter, temperature-differentiating mapping system for creating a temperature-level-differentiated, visually readable perimetral outline of a ground fire, with such outline being suitable for in-scale, registered overlay of a related topographic map, said system comprising thermal data-acquisition apparatus mountable on a support platform for moving over a ground fire and including means capable of outputting, selectively, different fire-perimeter, thermal-image-data streams which are differentiated by specific isothermal characteristics, latitude/longitude data-acquisition apparatus also so mountable and including means capable of outputting a latitude/longitude positional data stream, said thermal and latitude/longitude data-acquisition apparatuses being functional simultaneously to acquire time-related and positionally related data, thermal and latitude/longitude data-recording apparatus also so mountable and including plural recording channels each capable of recording time-synchronous thermal and latitude/longitude data, means operatively connecting said thermal data-acquisition apparatus, said latitude/longitude data-acquisition apparatus and said data-recording apparatus including switching means interposed the latter and said thermal data-acquisition apparatus operable to direct selectively to different channels different isothermally differentiated, fire-perimeter data streams to different channels, data reading and analyzing means operatively couplable to said data-recording apparatus for extracting therefrom and analyzing data contained in each of said channels, and being operative, as a consequence of having analyzed such data, to produce an X-Y graphic-plotter control signal effective to drive such a plotter in a manner causing the same to create a perimetral outline of a fire reflected in the data contained in the channels, with this outline containing line characteristics that are different from one another, with each such line characteristic being specific to a different one of the isothermal characteristics selected for recording in the different channels, and an X-Y graphic plotter operatively connected to said reading and analyzing means for receiving and responding to a control signal produced by the latter to produce a proper-scale registrable overlay of the perimetral outline of an observed fire, with such outline having said different line characteristics suitable for registered overlaying onto an in-scale, related topographic map.

2. The system of claim 1 which further includes an optical data-acquisition subsystem for acquiring and recording an optical depiction of the fire area viewed by the thermal data-acquisition apparatus, all for the purpose of permitting selected visual overlay of recorded optical and recorded thermal information.

3. The fire-perimeter, temperature-differentiating mapping system of claim 1 further comprising an air-mobile support platform, wherein said thermal data-acquisition apparatus, said latitude/longitude data-acquisition apparatus and said thermal and latitude/longitude data recording apparatus are all supported by said air-mobile support platform.

4. The fire-perimeter, temperature-differentiating mapping system of claim 3, wherein said platform is mounted in a rotary-winged aircraft.

5. The fire-perimeter, temperature-differentiating mapping system of claim 1, wherein said thermal data-acquisition apparatus and said latitude/longitude data-acquisition apparatuses are constructed and adjusted to receive thermal and positional information while overflying the fire in multiple passes at an altitude of approximately 50- to 150-feet above the ground surface.

6. A method for creating a temperature-level-differentiated, visually readable, perimetral outline of a ground fire, with such outline being suitable for in-scale, registered overlay of a related topographic map, said method comprising acquiring and recording data to illustrate thermally, and in selected, differentiated isothermal levels, the perimetral outline of a ground fire, linking, on a common time basis with such data, related latitude/longitude positional data, analyzing all of such data to produce an X-Y graphic-plotter control signal which is effective to drive such a plotter in a manner causing the latter to create a perimetral outline of the fire reflected in the recorded data, with this outline containing line characteristics that are different from one another, with each such line characteristic being specific to a different one of the selected, differentiated isothermal levels, and utilizing such signal to drive such a plotter for the purpose of causing the latter to produce a proper-in-scale, registrable overlay of the perimetral outline of an observed fire, with such outline having the different line characteristics just mentioned suitable for registered overlaying onto an in-scale, related topographic map.

7. The method of claim 6 which further includes acquiring and recording an optical depiction of the fire area viewed thermally, and utilizing such depiction to permit a recordable and visually presentable overlay of time-related thermal and optical imagery.

8. The method of claim 6 further comprising overflying the ground fire in multiple passes.

* * * * *

(12) EX PARTE REEXAMINATION CERTIFICATE (6408th)
United States Patent
Johnson

(10) Number: US 5,160,842 C1
(45) Certificate Issued: Sep. 2, 2008

(54) INFRARED FIRE-PERIMETER MAPPING

(75) Inventor: David A. Johnson, Jefferson, OR (US)

(73) Assignee: RAM Systems LLC, Jefferson, OR (US)

Reexamination Request:
No. 90/007,357, Dec. 28, 2004

Reexamination Certificate for:
Patent No.: 5,160,842
Issued: Nov. 3, 1992
Appl. No.: 07/719,843
Filed: Jun. 24, 1991

(51) Int. Cl.
*G01C 11/00* (2006.01)
*G08B 17/12* (2006.01)

(52) U.S. Cl. .................. 250/338.1; 250/330; 250/340; 250/342; 250/554; 340/578

(58) Field of Classification Search .............. None
See application file for complete search history.

(56) References Cited

PUBLICATIONS

Weiss and Freiherr, All Eyes on Planet Earth, Computer Graphics World, Nov. 1989, pp. 37 & 42, US.
Nordwall, Airborne Surveillance Will Give Forest Service Real–Time Fire Maps, Aviation Week & Space Technology, May 29, 1989, pp. 105 & 107, US.
Ogilvie and Fitch, Computerized Infrared System for Observation of Prescribed Fires, Fire Management Notes, 1989, pp. 2, 4–6, vol. 50 No. 3, US.
Nichols, Britten, Parks and Voss, A Feasibility Study: California Department of Forestry and Fire protection Utilization of Infrared Technologies for Wildland Fire Suppression and Management, Aug. 1990, pp. iii, v–vii, & 1–72.
Warren, Changes in Infrared use in Fire Management, Protecting Natural Resources with Remote Sensing, Apr. 1990, pp. 259–269, American Society for Photogrammetry and remote Sensing, US.
Warren and Wilson, Airborne Infrared Forest Fire Surveillance—A Chronology of USDA Forest Service Research and Development, Aug. 1981, pp. 1–8, United States Department of Agriculture Forest Service. US.
Daedalus Scanner Applications . . . Worldwide, 1984, pp. 6, 7, & 16–19, Daedalus Enterprises, Inc., UA.
McLeod, Martin and Warren, A Feasibility Study:Forest Fire Advanced System Technology (FFAST), Sep. 1, 1983, pp. iv–vii, ix–xiv, & 1–60, Jet Propulsion Laboratory, US.
Nichols, and Warren, Conceptual Design Study:Forest Fire Advanced System Technology (FFAST), Feb. 15, 1985, pp. iii–viii & 1–1—A–47, Jet Propulsion Laboratory, US.
Nichols and Warren, Forest Fire Advanced System Technology(FFAST):A Conceptual Design for Detection and Mapping, Apr. 1987, pp. 85–91, Wildland Fire 2000, US.
Nichols and Warren, Forest Fire Advanced System Technology(FFAST) Conceptual Design Study, 1986, pp. 2–8, SPIE vol. 694 Airborne Reconnaissance X, US.
Public Information Office Jet Propulsion Laboratory California Institute of Technology National Aeronautics and Space Administration, Oct. 27, 1988, Pasadena CA US.
Public Information Office Jet Propulsion Laboratory California Institute of Technology National Aeronautics and Space Administration, Mar. 29, 1991, pp. 1–3, Pasadena CA US.
Colwel, Manual of Remote Sensing, Second Edition, vol. 1, Theory, Instruments and Techniques, pp. 923–958, 987 & 1023–1039, 1109–1115, 1497, 1512, & 2145–2146, American Society of Photosymmetry 118.

(Continued)

*Primary Examiner*—Albert J Gagliardi

(57) ABSTRACT

A fire-perimeter, temperature-differentiating mapping system for creating a temperature-level-differentiated, visually readable outline of a ground fire, which outline is suitable for in-scale registered overlay of a related topographic map for the purpose of aiding firefighters in determining where best to allocate fire-fighting resources.

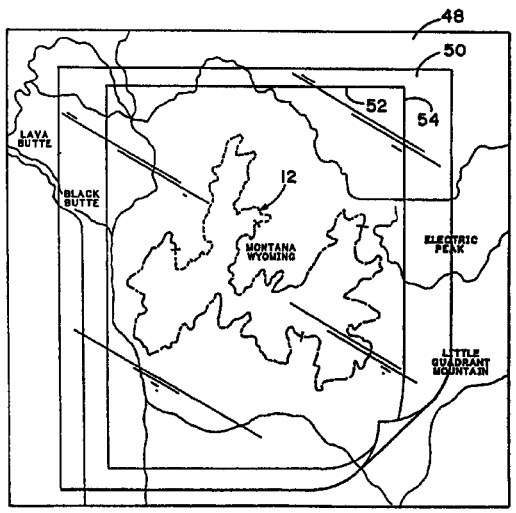

PUBLICATIONS

Greer, Improving forest wildfire suppression using penetrating reconnaissance and real time data transfer, 1989, pp. 105–132, SPIE vol. 1156 Airborne Reconnaissance XIII, USDA–Forest Service, US.

Krukeberg, More Accurate Scanner, Faster Aircraft Tested, 1972, pp. 11–13, US Department of Agriculture—Forest Service vol. 33, No. 1, US.

Warren and Hanks, Fie Mouse Trap/Troll Prototype Test & Operation Report, Jan. 1986, State of Alaska Division of Forestry, US.

Warren, Fire Mapping with the Fire Mouse Trap, Jul. 1986, USDA Forest Service Advanced Electronics Systems Development Group Aviation and Fire Management, US.

Lillesand and Kiefer, Remote Sensing and Image Interpretation, Second Edition, John Wiley & Sons, New York, US.

Weaver, Sensor Fusion II, Mar. 1989, pp. 7–14, SPIE—The International Society for Optical Engineering, US.

Forest Fire Mapping, 1988.

Ambrosia and Brass, Thermal Analysis of Wildfires and Effects on Global Ecosystem Cycling, 1988, pp. 29–39, Geocarto International (1), US.

Brass, Ambrosia, Riggan, Myers and Arvesen, Aircraft and Satellite Thermographic Systems for Wildfire Mapping & Assessment, Jan. 1987, AIAA 25th Aerospace Sciences Meeting.

Warren, Thermal Infrared Users Manual, Jul. 1987, p. i–ii, & 1–50, USDA—Forest Service, Advanced Electronics Systems Development Group Aviation and Fire Management, US.

Hanks, Warren and Pendleton, Alaska Division of Forestry Goes Trolling, 1986, pp. 32–36, USDA–Forest Service vol. 47, No. 1, US.

Bjornsen, Infrared Fire Mapping: The Untold Story, 1989, pp. 13–15, USDA—Forest Service, vol. 50, No. 4, US.

Warren, Thermal Infrared (IR) Line Scanner and FLIR Services available for fire management tasks from Commercial, Government, and Foreign Sources, May 1989.

Nellis, High Altitude Aircraft Remote Sensing During the 1988 Yellowstone National Park Wildfires, 1990, pp. 43–47, Geocarto International (3), US.

Incident Command System, Infrared Interpreter 1–443, US.

AGEMA Thermovision® 870 Operating Manual, New Publication No. 1 557 63, Rev A, Nov. 8, 2002, © 1986. (142 pages).

PATHLINK™ System Installation/Operation, Manual Part No. 9207, Revision 000, Sep. 1989, (12 pages).

PATHLINK™ Recorder Model PR2000 Installation/Operation, Manual Part No. 9–2002–01, Revision 000, Sep. 1989, © 1986, 1989 (48 pages).

PATHLINK™ Analyzer Model PA3500 Installation/Operation, Manual Part No. 9209, Revision 000, Sep. 1989 (32 pages).

Using the PATHLINK™ Analyzer Program—Release 4.1, Manual Part No. 9226, Revision 000, Jul. 1992 (54 pages).

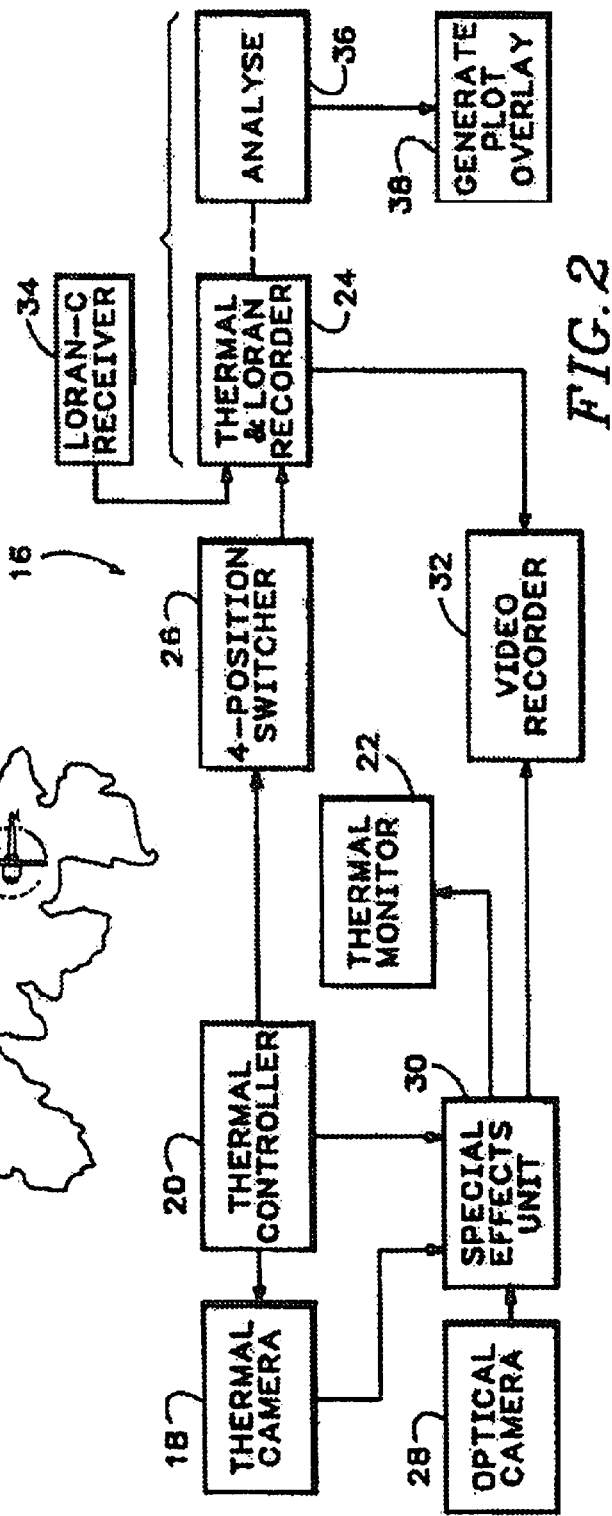
FIG.2 Amended

US 5,160,842 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE
SPECIFICATION AFFECTED BY AMENDMENT
ARE PRINTED HEREIN.

Column 4, lines 4–35:

Explaining how the system of the invention performs, during the flying over of a fire, flight takes place in several passes, typically three or four, generally above what can be observed to be the apparent perimeter of the fire. Both cameras in the system, are activated. The operator of the system, using visual observation and experience, and pre-selection of the several isothermal temperatures, or ranges thereabout, which he or she desires to record as making up the fire's perimeter, periodically throughout the various flight passes adjusts the thermal data-acquisition system, through adjustments made in controller 20, so that this system, at any given point in time, outputs from controller 20 to unit 30 and switcher [28] *26*, a thermal-image data stream which is related specifically to the selected isothermal temperature or range. For each such temperature or range, and system 16 as disclosed herein accommodates four, the operator selects the position for switcher [28] *26* which directs the selected thermal-image data into a prechosen related one of the four recording channels provided in recorder 24.

Column 4, lines 46–54:

All of the while that this is occurring, the appropriate selected channel in recorder 34 is recording, on a common-time basis, the selected isothermal information passing through switcher [28] *26*, as well as latitude/longitude positional information furnished via receiver 34. From the output mentioned earlier from recorder 24, latitude/longitude positional information is furnished for simultaneous recording, for later viewing review, on the media used by recorder 32.

Column 4, line 55–column 5, line 6:

As flight over the fire perimeter continues, the operator switches selectively, through operation of controller 20, to different ones, and as illustrated herein, all, of the four, possible, chosen isothermal characteristics of the fire line, simultaneously selecting the appropriate position for switcher [28] *26* to direct, for each of the different selected isothermal characteristics, thermal-image data to the appropriate, associated recording channel in recorder 24. When a change is made in the current selection of isothermal information, the operations of recorder 24, recorder 32 and monitor 22 are as described initially hereinabove, vis-a-vis (1) recording thermal-image and latitude/longitude positional information in recorder 24, (2) recording latitude/longitude positional information as well as overlayed thermal and optical information in recorder 32, and (3) presenting overlayed thermal and optical information on monitor 22, with the recorded and presented thermal information at any given time relating directly to the then selected-to-be-viewed isothermal condition of the fire's perimeter.

THE DRAWING FIGURE(S) HAVE BEEN
CHANGED AS FOLLOWS:

In FIG. 2, reference number 28 has been changed to 26.

AS A RESULT OF REEXAMINATION, IT HAS BEEN DETERMINED THAT:

The patentability of claims 1 and 6 is confirmed.

Claims 2–3, 5 and 7–8 are determined to be patentable as amended.

Claim 4, dependent on an amended claim, is determined to be patentable.

2. [The system of claim 1 which further includes] *A fire-perimeter, temperature-differentiating mapping system for creating a temperature-level-differentiated, visually readable perimetral outline of a ground fire, with such outline being suitable for in-scale, registered overlay of a related topographic map, said system comprising*

*thermal data-acquisition apparatus mountable on a support platform for moving over a ground fire and including means capable of outputting, selectively, different fire-perimeter, thermal-image-data streams which are differentiated by specific isothermal characteristics,*

*latitude/longitude data-acquisition apparatus also so mountable and including means capable of outputting a latitude/longitude positional data stream, said thermal and latitude/longitude data-acquisition apparatuses being functional simultaneously to acquire time-related and positionally related data,*

*thermal and latitude/longitude data-recording apparatus also so mountable and including plural recording channels each capable of recording time-synchronous thermal and latitude/longitude data,*

*means operatively connecting said thermal data-acquisition apparatus, said latitude/longitude data-acquisition apparatus and said data-recording apparatus including switching means interposed the latter and said thermal data-acquisition apparatus operable to direct selectively to different channels different isothermally differentiated, fire-perimeter data streams to different channels,*

*data reading and analyzing means operatively couplable to said data-recording apparatus for extracting therefrom and analyzing data contained in each of said channels, and being operative, as a consequence of having analyzed such data, to produce an X-Y graphic-plotter control signal effective to drive such a plotter in a manner causing the same to create a perimetral outline of a fire reflected in the data contained in the channels, with this outline containing line characteristics that are different from one another, with each such line characteristic being specific to a different one of the isothermal characteristics selected for recording in the different channels,*

*an X-Y graphic plotter operatively connected to said reading and analyzing means for receiving and responding to a control signal produced by the latter to produce a proper-scale registrable overlay of the perimetral outline of an observed fire, with such outline having said different line characteristics suitable for registered overlaying onto an in-scale, related topographic map, and*

*an optical data-acquisition subsystem for acquiring and recording an optical depiction of the fire area viewed by* the thermal data-acquisition apparatus, all for the purpose of permitting selected visual overlay of recorded optical and recorded thermal information.

3. [The fire-perimeter, temperature-differentiating mapping system of claim 1 further comprising] *A fire-perimeter, temperature-differentiating mapping system for creating a temperature-level-differentiated, visually readable perimetral outline of a ground fire, with such outline being suitable for in-scale, registered overlay of a related topographic map, said system comprising*

*thermal data-acquisition apparatus mountable on a support platform for moving over a ground fire and including means capable of outputting, selectively, different fire-perimeter, thermal-image-data streams which are differentiated by specific isothermal characteristics,*

*latitude/longitude data-acquisition apparatus also so mountable and including means capable of outputting a latitude/longitude positional data stream, said thermal and latitude/longitude data-acquisition apparatuses being functional simultaneously to acquire time-related and positionally related data,*

*thermal and latitude/longitude data-recording apparatus also so mountable and including plural recording channels each capable of recording time-synchronous thermal and latitude/longitude data,*

*means operatively connecting said thermal data-acquisition apparatus, said latitude/longitude data-acquisition apparatus and said data-recording apparatus including switching means interposed the latter and said thermal data-acquisition apparatus operable to direct selectively to different channels different isothermally differentiated, fire-perimeter data streams to different channels,*

*data reading and analyzing means operatively couplable to said data-recording apparatus for extracting therefrom and analyzing data contained in each of said channels, and being operative, as a consequence of having analyzed such data, to produce an X-Y graphic-plotter control signal effective to drive such a plotter in a manner causing the same to create a perimetral outline of a fire reflected in the data contained in the channels, with this outline containing line characteristics that are different from one another, with each such line characteristic being specific to a different one of the isothermal characteristics selected for recording in the different channels,*

*an X-Y graphic plotter operatively connected to said reading and analyzing means for receiving and responding to a control signal produced by the latter to produce a proper-scale registrable overlay of the perimetral outline of an observed fire, with such outline having said different line characteristics suitable for registered overlaying onto an in-scale, related topographic map, and* an air-mobile support platform, wherein said thermal data-acquisition apparatus, said latitude/longitude data-acquisition apparatus and said thermal and latitude/longitude data recording apparatus are all supported by said air-mobile support platform.

5. [The fire-perimeter, temperature-differentiating mapping system of claim 1.] *A fire-perimeter, temperature-differentiating mapping system for creating a temperature-level-differentiated, visually readable perimetral outline of a ground fire, with such outline being suitable for in-scale, registered overlay of a related topographic map, said system comprising*

*thermal data-acquisition apparatus mountable on a support platform for moving over a ground fire and including means capable of outputting, selectively, different fire-perimeter, thermal-image-data streams which are differentiated by specific isothermal characteristics,*

*latitude/longitude data-acquisition apparatus also so mountable and including means capable of outputting a latitude/longitude positional data stream, said thermal and latitude/longitude data-acquisition apparatuses being functional simultaneously to acquire time-related and positionally related data,*

*thermal and latitude/longitude data-recording apparatus also so mountable and including plural recording channels each capable of recording time-synchronous thermal and latitude/longitude data,*

*means operatively connecting said thermal data-acquisition apparatus, said latitude/longitude data-acquisition apparatus and said data-recording apparatus including switching means interposed the latter and said thermal data-acquisition apparatus operable to direct selectively to different channels different isothermally differentiated, fire-perimeter data streams to different channels,*

*data reading and analyzing means operatively couplable to said data-recording apparatus for extracting therefrom and analyzing data contained in each of said channels, and being operative, as a consequence of having analyzed such data, to produce an X-Y graphic-plotter control signal effective to drive such a plotter in a manner causing the same to create a perimetral outline of a fire reflected in the data contained in the channels, with this outline containing line characteristics that are different from one another, with each such line characteristic being specific to a different one of the isothermal characteristics selected for recording in the different channels, and*

*an X-Y graphic plotter operatively connected to said reading and analyzing means for receiving and responding to a control signal produced by the latter to produce a proper-scale registrable overlay of the perimetral outline of an observed fire, with such outline having said different line characteristics suitable for registered overlaying onto an in-scale, related topographic map* wherein said thermal data-acquisition apparatus and said latitude/longitude data-acquisition apparatuses are constructed and adjusted to receive thermal and positional information while overflying the fire in multple passes at an altitude of approximately 50- to 150-feet above the ground surface.

7. [The method of claim 6 which further includes] *A method for creating a temperature-level-differentiated, visually readable, perimetral outline of a ground fire, with such outline being suitable for in-scale, registered overlay of a related topographic map, said method comprising*

*acquiring and recording data to illustrate thermally, and in selected, differentiated isothermal levels, the perimetral outline of a ground fire,*

*linking, on a common time basis with such data, related latitude/longitude positional data,*

*analyzing all of such data to produce an X-Y graphic-plotter control signal which is effective to drive such a plotter in a manner causing the latter to create a perimetral outline of the fire reflected in the recorded data, with this outline containing line characteristics that are different from one another, with each such line characteristic being specific to a different one of the selected, differentiated isothermal levels,* utilizing such signal to drive such a plotter for the purpose of causing the latter to produce a proper-in-scale, registrable overlay of the perimetral outline of an observed fire, with such outline having the different line characteristics just mentioned suitable for registered overlaying onto an in-scale, related topographic map, and acquiring and recording an optical depiction of the fire area viewed thermally, and utilizing such depiction to permit a recordable and visually presentable overlay of time-related thermal and optical imagery.

8. [The method of claim 6 further comprising] *A method for creating a temperature-level-differentiated, visually readable, perimetral outline of a ground fire, with such outline being suitable for in-scale, registered overlay of a related topographic map, said method comprising*

*acquiring and recording data to illustrate thermally, and in selected, differentiated isothermal levels, the perimetral outline of a ground fire,*

*linking, on a common time basis with such data, related latitude/longitude positional data,*

*analyzing all of such data to produce an X-Y graphic-plotter control signal which is effective to drive such a plotter in a manner causing the latter to create a perimetral outline of the fire reflected in the recorded data, with this outline containing line characteristics that are different from one another, with each such line characteristic being specific to a different one of the selected, differentiated isothermal levels,*

*utilizing such signal to drive such a plotter for the purpose of causing the latter to produce a proper-in-scale, registrable overlay of the perimetral outline of an observed fire, with such outline having the different line characteristics just mentioned suitable for registered overlaying onto an in-scale, related topographic map, and* overflying the ground fire in multiple passes.

\* \* \* \* \*